United States Patent
Chen et al.

(10) Patent No.: US 9,919,297 B2
(45) Date of Patent: Mar. 20, 2018

(54) ZEOLITE, AND PRODUCTION METHOD AND USE THEREFOR

(71) Applicant: Mitsubishi Chemical Corporation, Tokyo (JP)

(72) Inventors: Haijun Chen, Yokohama (JP); Takahiko Takewaki, Yokohama (JP); Takeshi Matsuo, Yokohama (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 93 days.

(21) Appl. No.: 15/016,423

(22) Filed: Feb. 5, 2016

(65) Prior Publication Data
US 2016/0151772 A1    Jun. 2, 2016

Related U.S. Application Data

(63) Continuation of application No. PCT/JP2014/070527, filed on Aug. 4, 2014.

(30) Foreign Application Priority Data

Aug. 5, 2013  (JP) ................................ 2013-162439

(51) Int. Cl.
*C01B 39/48* (2006.01)
*B01J 29/70* (2006.01)
(Continued)

(52) U.S. Cl.
CPC .......... *B01J 29/76* (2013.01); *B01D 53/9418* (2013.01); *B01J 37/10* (2013.01); *C01B 39/48* (2013.01);
(Continued)

(58) Field of Classification Search
CPC ........... B01J 29/70; B01J 29/76; C01B 39/48; B01D 53/9418
See application file for complete search history.

(56) References Cited

U.S. PATENT DOCUMENTS 3,904,738 A    9/1975 Robson
4,610,856 A *  9/1986 Skeels .................... B01J 29/084
                                                423/715
(Continued)

FOREIGN PATENT DOCUMENTS

CN          1792793        6/2006
CN       102439123 A       5/2012
(Continued)

OTHER PUBLICATIONS

Robson et al, Synthesis and Crystal Structure of Zeolite Rho—A New Zeolite related to Linde Type A, Meier and Uytterhoeven: Molecular Sieves Advances in Chemistry; American Chemical Society; Washington DC, (1973) pp. 106-115.*

(Continued)

*Primary Examiner* — David M Brunsman
(74) *Attorney, Agent, or Firm* — Oblon, McClelland, Maier & Neustadt, L.L.P.

(57) ABSTRACT

The present invention provides a novel high-silica zeolite having a high molar ration of a tetravalent element (Y) to a trivalent element (X) in terms of oxide.

A zeolite, comprising at least a trivalent element X and a tetravalent element Y, wherein a molar ratio $n=YO_2/X_2O_3$ in terms of oxide is 9.5 or more, and the zeolite comprises an RHO-type structure, or comprising at least a trivalent element X and a tetravalent element Y, wherein a molar ratio $n=YO_2/X_2O_3$ in terms of oxide is 9.5 or more, and a characteristic X-ray diffraction pattern. This zeolite is produced by hydrothermal synthesis of a zeolite from an aqueous gel that is prepared by adding a mixed solution comprising a crown ether, an alkali, and water to a solution containing an aluminum atom material, and by then dropwise adding a liquid containing a silicon atom material.

11 Claims, 10 Drawing Sheets

(51) Int. Cl.
  *B01J 29/76* (2006.01)
  *B01D 53/94* (2006.01)
  *B01J 37/10* (2006.01)

(52) U.S. Cl.
  CPC ............ *B01D 2251/208* (2013.01); *B01D 2251/2062* (2013.01); *B01D 2251/2067* (2013.01); *B01D 2255/20761* (2013.01); *B01D 2255/50* (2013.01); *B01D 2258/012* (2013.01); *B01J 2229/183* (2013.01)

(56) References Cited

U.S. PATENT DOCUMENTS

| | | |
|---|---|---|
| 5,139,761 A | 8/1992 | Nair et al. |
| 5,230,790 A | 7/1993 | Nair et al. |
| 5,371,311 A | 12/1994 | Nair et al. |
| 5,385,718 A | 1/1995 | Casci et al. |
| 5,446,234 A | 8/1995 | Casci et al. |
| 5,447,709 A | 9/1995 | Anglerot et al. |
| 5,464,799 A | 11/1995 | Casci et al. |
| 5,536,895 A | 7/1996 | Nair et al. |
| 6,350,428 B1 | 2/2002 | Verduijn et al. |
| 8,409,546 B2 | 4/2013 | Bull et al. |
| 2004/0033370 A1 | 2/2004 | Chau et al. |
| 2004/0058799 A1 | 3/2004 | Chau et al. |
| 2011/0251048 A1 | 10/2011 | Ariga et al. |
| 2012/0024777 A1 | 2/2012 | Sugita et al. |
| 2012/0067216 A1* | 3/2012 | Corma Canos ........ B01D 53/04 95/95 |
| 2012/0095276 A1 | 4/2012 | Zhang et al. |
| 2014/0170045 A1 | 6/2014 | Fedeyko et al. |
| 2015/0217282 A1 | 8/2015 | Fedeyko et al. |

FOREIGN PATENT DOCUMENTS

| | | | |
|---|---|---|---|
| EP | 0 582 737 A1 | 2/1994 | |
| EP | 0 804 959 A1 | 11/1997 | |
| EP | 0804959 A4 * | 1/1998 | ......... B01D 53/9418 |
| JP | 6-126183 | 5/1994 | |
| JP | 6-219728 | 8/1994 | |
| JP | 6-219729 | 8/1994 | |
| JP | 7-48122 | 2/1995 | |
| JP | 8-229405 | 9/1996 | |
| JP | 9-38464 | 2/1997 | |
| JP | 9-255326 | 9/1997 | |
| JP | 11-60236 | 3/1999 | |
| JP | 11-502804 | 3/1999 | |
| JP | 2004-26644 | 1/2004 | |
| JP | 2004-141829 | 5/2004 | |
| JP | 2010-168269 | 8/2010 | |
| JP | 2011-121854 | 6/2011 | |
| JP | 2012-96983 | 5/2012 | |
| JP | 2012-524048 | 10/2012 | |
| WO | WO 96/29284 A1 | 9/1996 | |
| WO | WO 02/16028 A1 | 2/2002 | |
| WO | WO 2010/119163 A1 | 10/2010 | |
| WO | WO 2012/170421 A1 | 12/2012 | |

OTHER PUBLICATIONS

Liu et al, Hydrothermal syntheis of zeolite Rho using methylcellulose as the space confinement additive, Ceramics International 39 (2013) pp. 5453-5458.*
Ataki et al, Adsorption of carbon dioxide and nitrogen on zeolite rho prepared by hydrothermal synthesis using 18-crown-6 ether, Journal of Colloid and Interface Science 388 (2012) pp. 185-190.*
European Office Action dated Apr. 12, 2017 in Patent Application No. 14 834 021.9.
Extended European Search Report dated Jun. 30, 2016 in Patent Application No. 14834021.9.
Xu Liu, et al., "Hydrothermal synthesis of zeolite Rho using methylcellulose as the space-confinement addictive", Ceramics International, vol. 39, No. 5, 2013, XP028526904, pp. 5453-5458.
Combined Chinese Office Action and Search Report dated Aug. 29, 2016 in Patent Application No. 201480044417.6 (with English translation).
Office Action dated Apr. 12, 2017 in Chinese Patent Application No. 201480044417.6 (with English translation).
English translation of International Preliminary Report on Patentability and Written Opinion dated Feb. 18, 2016 in PCT/JP2014/070527.
International Search Report dated Nov. 4, 2014 in PCT/JP2014/070527, filed on Aug. 4, 2014.
Beatriz Omaira Hincapie Palacio "Synthesis and Characterization of Nanocrystalline Mordenite, High Silica Zeolite", Doctoral Dissertation, University of Connecticut,2005, 119 pages.
T. Chatelain et al. "Synthesis and Characterization of high-silica zeolite RHO prepared in the presence of 18-crown-6 ether as organic template", Microporous Materials 4, 1995, 8 pages.
Harry E. Robson et al. "Synthesis and Crystal Structure of Zeolite Rho—A New Zeolite Related to Linde Type A", Adv. Chem Ser. vol. 121, 1973, 5 pages.
Sadao Araki et al. "Crystallization process of zeolite rho prepared by hydrothermal synthesis using 18-crown-6 ether as organic template", Journal of Colloid and Interface Science, vol. 376, 2012, 6 pages.
Sadao Araki et al. "Adsorption of carbon dioxide and nitrogen on zeolite rho prepared by hydrothermal synthesis using 18-crown-6 ether", Journal of Colloid and Interface Science, vol. 388, 2012, 6 pages.
Miguel Palomino et al. "Zeolite Rho: a highly selective adsorbent for $CO_2/CH_4$ separation induced by a structural phase modification", Chemical Communications, vol. 48, 2012, 3 pages.
Reinhard X. Fischer et al. "Neutron Powder Diffraction Study and Physical Characterization of Zeolite D-RHO Deep-bed Calcined at 773 and 923 K", Journal of Physical Chemistry, vol. 90, 1986, 10 pages.
Reinhard X. Fischer et al. "Weakly Acidic Bridging Hydroxyl Groups and Nonframework Aluminum Species in Zeolite D-RHO Shallow-Bed Calcined in Steam", Journal of Physical Chemistry, vol. 91, 1987, 4 pages.
Magdalena M. Lozinska et al. "Understanding Carbon Dioxide Adsorption on Univalent Cation Forms of the Flexible Zeolite Rho at conditions relevant to carbon Capture from Flue Gases", Journal of the American Chemical Society, vol. 134, 2012, 15 pages.
Chinese Office Action dated Aug. 2, 2017 in Patent Application No. 201480044417.6 (with English translation).

* cited by examiner

ZEOLITE, AND PRODUCTION METHOD AND USE THEREFOR

CROSS-REFERENCE TO RELATED APPLICATION

This is a continuation of International Application PCT/JP2014/070527, filed on Aug. 4, 2014, and designated the U.S., (and claims priority from Japanese Patent Application 2013-162439 which was filed on Aug. 5, 2013) the entire contents of which are incorporated herein by reference.

TECHNICAL FIELD

The present invention relates to a novel high-silica zeolite, a method for producing the high-silica zeolite, and the use of the high-silica zeolite.

BACKGROUND ART

Currently, zeolites, having properties such as molecular-sieve effects due to pores caused by the framework structures of the zeolites, ion exchange ability, catalytic ability, and adsorption ability, have been widely utilized as adsorbents, ion exchange agents, industrial catalysts, and environmental catalysts.

The basic unit of a zeolite structure is the tetrahedral structure of $SiO_4$ or $AlO_4$ (collectively referred to as "$TO_4$ tetrahedron"). An RHO-type zeolite is composed of a body centered cubic arrangement of truncated cuboctahedra or α-cages linked by a double eight-membered ring. RHO-type aluminosilicate zeolites have received attention as separation materials because of exhibiting especially excellent flexibility for cations, gas molecules, water molecules, and the like due to framework structures peculiar to the RHO-type aluminosilicate zeolites (Patent Documents 1 and 2).

As an aluminosilicate zeolite, a zeolite having a practically high $SiO_2/Al_2O_3$ molar ratio (hereinafter referred to as "SAR") has been demanded in view of the stability, catalyst performance, and the like of the zeolite. It has been considered that in the case of using the zeolite for a use such as, for example, a catalyst for purifying exhaust emissions, the trivalent element-oxygen-tetravalent element bond (for example, Al—O—Si) of the zeolite is cleaved to separate the trivalent element (for example, Al), which decreases the activity of a metal supported as a catalyst, thereby deteriorating the ability of the catalyst, under the situation of high temperature and the presence of moisture. Further, damage to the structure itself of a zeolite is problematic even if the zeolite is not for a catalyst. It is expected that possible obtainment of a zeolite having a high SAR results in the decreased number of bonds between a trivalent element (for example, Al) and oxygen, and therefore enables stability to be improved and the deterioration of catalytic activity to be prevented. Thus, many zeolites having high SAR have been conventionally synthesized using organic compound structure-directing agents (SDAs). RHO-type aluminosilicate zeolites synthesized without any SDAs have low SAR (about 3) and contain large amounts of impurities (Non Patent Document 1 and Patent Document 3). On the other hand, in 1995, J. Patarin et al. synthesized an RHO-type zeolite having a high SAR of 8.8 using 18-crown-6-ether as an SDA (Non Patent Document 2). Since then, any synthesized RHO-type zeolite having an SAR of more than 8.8 has not been obtained although researchers have examined various synthetic conditions and have attempted synthesis of an RHO-type zeolite having a higher SAR (Non Patent Documents 3 to 6).

Further, Non Patent Documents 7 to 9 propose methods for producing an RHO-type aluminosilicate zeolite having high stability by subjecting a synthesized RHO-type aluminosilicate zeolite to high-temperature steaming treatment to extract some of Al atoms in the framework from the framework, thereby synthesizing the zeolite having a high SAR with respect to the Al atoms present in the framework of the zeolite. However, in the RHO-type aluminosilicate zeolite prepared by the methods, the Al atoms extracted from the framework remain as AlOx seeds in the pores of the zeolite, and therefore, it is impossible to enhance the overall SAR of the zeolite including the inside and outside of the framework. Further, the AlOx seed molecules preclude entrance into and exit from the internal cages and the pores of the zeolite, and it is impossible to sufficiently obtain performances such as ion exchange ability, catalytic ability, and adsorption separation ability for a zeolite.

CITED DOCUMENT

Patent Document

Patent Document 1: WO 2002/016028
Patent Document 2: WO 2010/119163
Patent Document 3: U.S. Pat. No. 3,904,738

Non Patent Document

Non Patent Document 1: Molecular Sieves, (Adv. Chem. Ser., Vol. 121), 1973, p. 106.
Non Patent Document 2: Microporous Materials, 4 (1995), 231-238.
Non Patent Document 3: Hincapie Palacio, Beatriz Omaira, "Synthesis and characterization of nanocrystalline mordenite, high silica zeolite RHO, and copper faujasite" (2005). Doctoral Dissertations. Paper AAI3180211, University of Connecticut.
Non Patent Document 4: Journal of Colloid and Interface Science, 376 (2012), 28-33.
Non Patent Document 5: Journal of Colloid and Interface Science, 388 (2012), 185-190.
Non Patent Document 6: Chemical Communications, 48 (2012), 215-217.
Non Patent Document 7: Journal of Physical Chemistry, 90 (1986), 4414-4423.
Non Patent Document 8: Journal of Physical Chemistry, 91 (1987), 2227-2230.
Non Patent Document 9: Journal of the American Chemical Society, 134 (2012), 17628-17642.

SUMMARY OF THE INVENTION

Technical Problem

An object of the present invention is to provide an RHO-type zeolite which is a novel zeolite having a high molar ratio of a tetravalent element Y to a trivalent element X in terms of oxide, and particularly preferably a high-silica zeolite in which Y is mainly silicon.

Solution to Problem

As a result of intensive examination, the present inventors found that optimization of the procedure of mixing materials for synthesizing a zeolite enables a novel zeolite having a molar ratio of a tetravalent element Y to a trivalent element X in terms of oxide of 9.5 or more, and preferably a high-silica zeolite to be synthesized, and the above-described problems to be solved.

The present invention was accomplished based on such findings, and has the following main points.

[1] A zeolite, comprising at least a trivalent element X and a tetravalent element Y, wherein a molar ratio $n=YO_2/X_2O_3$ in terms of oxide is 9.5 or more, and the zeolite comprises an RHO-type structure.

[2] A zeolite, comprising at least a trivalent element X and a tetravalent element Y, wherein a molar ratio $n=YO_2/X_2O_3$ in terms of oxide is 9.5 or more, and at least lattice spacings d (d-spacings) (Å) listed in <Table 1> below are detected in measurement by powder X-ray diffractometry.

TABLE 1

| d-spacing (Å) |
|---|
| 10.58 ± 0.40 |
| 6.10 ± 0.30 |
| 5.28 ± 0.20 |
| 4.73 ± 0.30 |
| 4.32 ± 0.10 |
| 4.00 ± 0.20 |
| 3.52 ± 0.10 |
| 3.34 ± 0.10 |

[3] The zeolite according to [1] or [2], further comprising a template Q, wherein a molar ratio $m=Q/X_2O_3$ is more than 0 and less than 6.

[4] The zeolite according to any one of [1] to [3], wherein X comprises at least aluminum.

[5] The zeolite according to any one of [1] to [4], wherein Y comprises at least silicon.

[6] The zeolite according to any one of [1] to [5], further comprising another metal element.

[7] The zeolite according to [6], wherein the other metal element is iron and/or copper.

[8] The zeolite according to [6] or [7], wherein a content of the other metal element is 0.5% by weight or more and 10% by weight or less in a total amount of the zeolite comprising the other metal element under an anhydrous state.

[9] A catalyst, comprising the zeolite according to any one of [1] to [8].

[10] An exhaust as treatment catalyst, comprising the zeolite according to any one of [1] to [8].

[11] The exhaust gas treatment catalyst according to [10], wherein the exhaust gas treatment catalyst is a selective reduction catalyst for an exhaust gas comprising a nitrogen oxide.

[12] A method for producing a zeolite, comprising performing hydrothermal synthesis of a zeolite from an aqueous gel that is prepared by adding a mixed solution comprising a crown ether, an alkali, and water to a solution containing an aluminum atom material, and by then dropwise adding a liquid containing a silicon atom material.

In addition, the following main points are further included.

[13] An exhaust gas treatment catalyst, comprising the zeolite according to the above [6].

[14] The exhaust gas treatment catalyst according to [13], wherein the exhaust gas treatment catalyst is a selective reduction catalyst for an exhaust gas comprising a nitrogen oxide.

[15] The exhaust gas treatment catalyst according to [13] or [14], wherein the exhaust gas treatment catalyst comprises at least aluminum as X and at least silicon as Y, and the other metal element is a transition metal.

[16] The exhaust gas treatment catalyst according to any one of [13] to [15], wherein the other metal element is iron and/or copper.

[17] The exhaust gas treatment catalyst according to any one of [13] to [16], wherein a content of the other metal element is 0.5 to 10% by weight in a total amount of the zeolite comprising the other metal element under an anhydrous state.

[18] The exhaust gas treatment catalyst according to any one of [13] to [17], wherein the other metal element is supported on the zeolite.

Effects of the Invention

In accordance with the present invention, there can be provided a novel zeolite, having a molar ratio of an oxide of a tetravalent element Y to an oxide of a trivalent element X of 9.5 or more, and an RHO-type structure, or a molar ratio of an oxide of a tetravalent element Y to an oxide of a trivalent element X of 9.5 or more, and a peculiar X-ray diffraction (XRD) pattern, as well as having high hydrothermal endurance and high catalytic activity, particularly preferably a high-silica zeolite.

DESCRIPTION OF EMBODIMENTS

Figure 1:
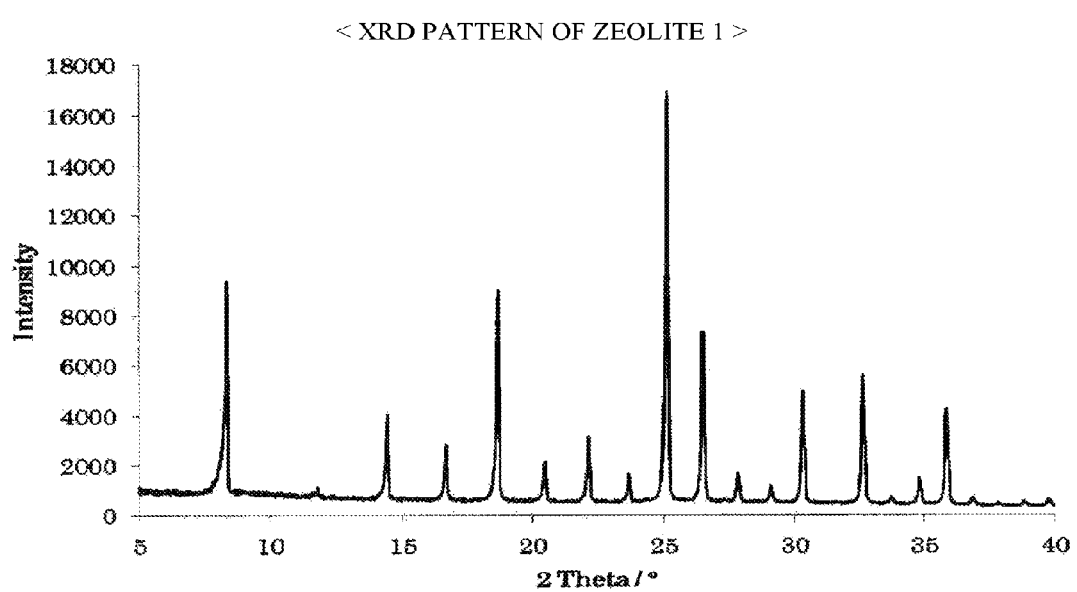
FIG. 1 is a chart illustrating the XRD pattern of a zeolite 1.

Embodiments of the present invention will be explained in detail below. However, the following explanation is an example (representative example) of the embodiments of the present invention, and the present invention is not limited to the contents of the embodiments at all.

In the present invention, an RHO-type zeolite corresponds to a code for defining an RHO structure in codes for directing zeolite structures specified by the International Zeolite Association (IZA). The features of the structure are determined by X-ray diffraction data. It will be appreciated that when an actually produced zeolite is measured, the intensity ratio and peak position of each peak are slightly deviated under the influence of the growth direction of the zeolite, the ratio of constituent elements, adsorbed substances, the presence of a defect, and the like, and therefore, a numerical value completely identical to each parameter of the RHO structure defined in the IZA is not obtained. Thus, in the case of actual determination, for example, specifically, in a case in which a result of XRD can be subjected to Rietveld analysis on the assumption of a space group of 1 m-3 m and lengths in axial directions equivalent to each other are around 10% or less, the crystal form thereof can be considered to be an RHO type. For example, specifically, the case of each in the range of 14.919 Å±1.4 Å is permitted and can be determined to be an RHO type. A correction of 2θ can be made by specification with a reference standard such as Si as needed.

For the analysis, for example, "RIETAN" developed by Dr. Fujio Izumi, or the like may be used without particular limitation.

[Zeolite of the Present Embodiment]

The zeolite of the present embodiment comprises at least a trivalent element X and a tetravalent element Y, wherein a molar ratio $n=YO_2/X_2O_3$ in terms of oxide is 9.5 or more, i.e., n≥9.5 in a chemical composition $X_2O_3$: (n) $YO_2$ is satisfied, and the zeolite has an RHO-type structure, or at least the lattice spacings d (Å) listed in the above <Table 1> are detected in measurement by powder X-ray diffractometry.

In the present embodiment, the measurement by the powder X-ray diffractometry is not particularly limited. Ordinarily, the measurement is carried out at a scanning axis of θ/2θ by irradiating a powder sample filled into a plate-shaped sample holder made of metal, glass, or the like with X-rays generated with CuKα as a radiation source. CoKα, MoKα, AgKα, and the like may also be used as the radiation source, which is not limited to CuKα. The sample may be ground into powder, for example, in an alumina mortar or an agate mortar.

The zeolite of the present embodiment may be a zeolite comprising an organic template commonly used in synthesis of a zeolite, or a zeolite comprising no template. The zeolite of the present embodiment comprising no template may be a zeolite synthesized without using any template, or a zeolite obtained by removing a template from a zeolite synthesized using the template.

The zeolite of the present embodiment is particularly preferably synthesized using an organic template, the zeolite of the present embodiment comprising a template just after the hydrothermal synthesis preferably has a crystal structure represented by a diffraction pattern (peak positions and intensities) shown in <Table 2> below in measurement by powder X-ray diffractometry, and the zeolite of the present embodiment after removal of such a template from a zeolite comprising the template preferably has a crystal structure represented by a diffraction pattern (peak positions and intensities) shown in <Table 3> below in measurement by powder X-ray diffractometry.

As is clear from comparisons between <Table 2> and <Table 3>, in the preferred zeolite of the present embodiment, peaks (maximum peaks) on which a relative intensity is based are different before and after the removal of the template. The reason for this is that the X-ray diffraction intensity caused by the (110) plane (d (Å)=10.58±0.4) of the RHO-type zeolite is increased by removing the template. In the RHO-type zeolite comprising no template, the X-ray diffraction intensity caused by the (110) plane is often the highest. The intensity of a peak refers to a value obtained by subtracting a background value from a measured value.

TABLE 2

<Lattice Spacing in State of Comprising Template, and Relative Intensity Thereof>

| d-spacing (Å) | Relative Intensity [100 × I/I (0)] |
|---|---|
| 10.58 ± 0.40 | 20 to 80 |
| 6.10 ± 0.30 | 10 to 90 |
| 5.28 ± 0.20 | 2 to 50 |
| 4.73 ± 0.30 | 20 to 80 |
| 4.32 ± 0.10 | 2 to 40 |
| 4.00 ± 0.20 | 2 to 50 |
| 3.52 ± 0.10 | 100 |
| 3.34 ± 0.10 | 20 to 80 |

TABLE 3

<Lattice Spacing after Removal of Template, and Relative Intensity Thereof>

| d-spacing (Å) | Relative Intensity [100 × I/I (0)] |
|---|---|
| 10.58 ± 0.40 | 100 |
| 6.10 ± 0.30 | 4 to 60 |
| 5.28 ± 0.20 | 4 to 60 |
| 4.73 ± 0.30 | 10 to 90 |
| 4.32 ± 0.10 | 2 to 50 |
| 4.00 ± 0.20 | 2 to 50 |
| 3.52 ± 0.10 | 10 to 99 |
| 3.34 ± 0.10 | 10 to 90 |

The relative intensity of each diffraction pattern is described as follows. For example, a peak having a relative intensity of 20 to 80 at a lattice spacing (d-spacing (angstrom)) of 10.58±0.40 in the powder X-ray diffraction pattern as shown in <Table 2> means that in powder X-ray diffractometry, the relative intensity of the maximum value of a peak at a position (2θ) at which a lattice spacing corresponding to 10.58±0.40 angstroms is 20 or more and 80 or less on the assumption that the maximum value, as a base, of a peak at a lattice spacing of 3.52±0.10 angstroms is 100.

The reason that the lattice spacing value may have a tolerance width (±0.10, ±0.40, etc.) depending on the peak position is because an X-ray diffraction peak may shift (in the case of adsorbing water or the like) due to a difference between the sizes of different framework atoms or a difference between the dry states of zeolites.

The powder X-ray diffraction pattern of the zeolite corresponds to a powder X-ray diffraction pattern expected from the structure of an RHO-type zeolite shown by a code specified by the International Zeolite Association (IZA). In other words, the zeolite of the present embodiment is a zeolite comprising a trivalent element X and a tetravalent element Y, wherein a molar ratio $n=YO_2/X_2O_3$ in terms of oxide is 9.5 or more, and the zeolite has an RHO-type structure.

In the zeolite of the present embodiment comprising an organic template, a molar ratio $m=Q/X_2O_3$ between the template Q and $X_2O_3$ is preferably more than 0 and less than 6. In other words, the zeolite of the present embodiment comprising the template Q preferably has the following chemical composition represented in a molar ratio:

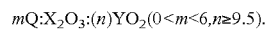

$mQ:X_2O_3:(n)YO_2(0<m<6,n≥9.5)$.

The above X is a trivalent element. As the trivalent element, which is not particularly limited, ordinarily, boron, aluminum, iron, and gallium are preferable, and boron, aluminum, and gallium are particularly preferable in view of ease of generation of zeolite crystals, and the like. These trivalent elements may be used singly, or two or more of the trivalent elements in combination may be contained in the zeolite. Especially, the zeolite of the present embodiment preferably comprises aluminum as the trivalent element X, wherein the aluminum is preferably 50 mol % or more, more preferably 80 mol % or more, of the total of X.

The above Y is a tetravalent element. As the tetravalent element, which is not particularly limited, ordinarily, silicon, germanium, tin, titanium, and zirconium are preferable, and silicon, germanium, tin, and titanium are particularly preferable in view of ease of generation of zeolite crystals, and the like. These tetravalent elements may be used singly, or two or more of the tetravalent elements in combination may be contained in the zeolite. Especially, the zeolite of the present embodiment preferably comprises silicon as the tetravalent element Y, wherein the silicon is preferably 50 mol % or more, more preferably 80 mol % or more, of the total of Y.

The above Q is a template. As the template, a macrocyclic compound, typified by a crown ether, is preferably used. As the macrocyclic compound, which is not particularly limited, a macrocyclic compound having a hetero atom such as oxygen, nitrogen, or sulfur as an electron-donating (donor) atom is preferable, and 12-crown-4-ether, 15-crown-5-ether, 18-crown-6-ether, 24-crown-8-ether, dibenzo-18-crown-6-ether, cryptand [2.2], and cryptand [2.2.2] are particularly preferable in view of ease of generation of zeolite crystals, and the like. The templates may be used singly, or in combination of two or more kinds thereof at an optional ratio.

The above value of n, which represents the molar ratio of the tetravalent element Y to the trivalent element X in terms of oxide, is 9.5 or more, preferably 9.8 or more, more preferably 10 or more, and still more preferably 10.5 or more, and the upper limit thereof, which is not particularly set, is ordinarily 500 or less, preferably 100 or less, more preferably 80 or less, and still more preferably 50 or less. The value of n that is not less than the above-described lower limit is preferable because of exhibiting excellent hydrothermal endurance. On the other hand, the value that is not more than the above-described upper limit is preferable because of easy crystallization. In the case of use in a catalyst, the presence of some acid sites, resulting in a number of catalytic active sites and ion exchange sites, is preferable, and therefore, n is preferably 100 or less. The above-described value of n represents a $SiO_2/Al_2O_3$ molar ratio "SAR" when the trivalent element X is an aluminum atom, and the tetravalent element Y is a silicon atom.

The above-described value of m is preferably more than 0 and less than 6, more preferably 0.1 or more, still more preferably 0.3 or more, and more preferably 5 or less, still more preferably 4 or less. Because the zeolite of the present embodiment is preferably synthesized using a template in view of enabling easy synthesis of a desired zeolite having the high molar ratio of an oxide of the tetravalent element Y to an oxide of the trivalent element X, it is preferable that the value of m of the zeolite before removing the template just after the synthesis is not less than the above-described lower limit. However, a too large amount of template used results in a higher production cost, and therefore, it is preferable that the value of m of the zeolite before removing the template just after the synthesis is not more than the above-described upper limit. The zeolite of the present embodiment also encompasses a zeolite with m=0, obtained by removing a template from a zeolite comprising the template at such a ratio.

The zeolite of the present embodiment may comprise a metal element other than the trivalent element X and the tetravalent element Y. Such a case of "comprise metal element" may be either a case in which the metal element is present in a framework or a case in which the metal element is present outside the framework, and also encompasses the case of a mixture thereof. In a case in which the zeolite of the present embodiment comprises the other metal element, examples of the metal element include, but are not particularly limited to, ordinarily the transition metals of Groups 3-12 of the Periodic Table, such as iron, cobalt, magnesium, zinc, copper, palladium, iridium, platinum, silver, gold, cerium, lanthanum, praseodymium, titanium, and zirconium, preferably Groups 8, 9, and 11 of the Periodic Table, such as iron, cobalt, and copper, and more preferably Groups 8 and 11 of the Periodic Table, in view of properties in uses in adsorbents and catalysts. The transition metal contained in the zeolite may be one of these transition metals, or two or more transition metals in combination may be contained in the zeolite. Of these transition metals, iron and/or copper are particularly preferred, and copper is especially preferred. In the case of comprising an element other than maximum components (ordinarily, silicon (which is not a metal but is described herein for descriptive purposes because of being the most abundant and a cation) and aluminum) among metal elements that can be trivalent or tetravalent as a result of inductively coupled plasma (ICP) emission spectroscopy (ICP analysis), and in the case of not detecting the peak of the metal element or a compound of the metal element as a result of XRD measurement, the metal element is considered to be part of the zeolite, i.e., to be present in the zeolite framework, and is handled as the trivalent element X or the tetravalent element Y.

Conversely, in the case of detecting the peak of the metal element or a compound of the metal element as a result of XRD measurement, the metal element is considered to be present as a metal element or a compound of the metal element on the surface of the zeolite, or the like, and is handled as a metal element other than the trivalent element X and the tetravalent element Y.

In a case in which the zeolite of the present embodiment comprises another metal element, the content of the other metal element in the zeolite is preferably 0.1% by weight or more, more preferably 0.3% by weight or more, particularly preferably 0.5% by weight or more, and preferably 20% by weight or less, particularly preferably 10% by weight or less, in the total amount of the zeolite under an anhydrous state. The inclusion of the other metal element such as iron or copper results in the effect of, e.g., generating the active sites of a catalyst. It is preferable that the excellent catalytic effect is obtained by setting the content of the included other metal element at not less than the above-described lower limit while homogeneous dispersion of the metal elements in the zeolite is facilitated to obtain excellent catalytic activity by setting the content at not more than the above-described upper limit.

In the zeolite of the present embodiment, metal cations such as sodium potassium, and cesium may be contained, or nonmetal cations such as ammonium ions ($NH_4^+$, hydrogen ions ($H^+$)) may be contained. The metal cations and the nonmetal cations may be simultaneously contained. Cations in a zeolite crystal can be replaced with other ions by ion exchange.

The zeolite of the present embodiment is characterized by having an X-ray powder diffraction pattern shown in the above <Table 1> regardless of the presence or absence of inclusion of another metal element or metal cations and of the presence or absence of ion exchange.

The analysis of the composition of the zeolite of the present embodiment, and the analysis of the content of another metal element can be carried out by a method described in the items of Examples described later.

With regard to the content of a template, m can be determined by removing the template from a zeolite comprising the template according to a template removal method described later, calculating the content weight of the template from zeolite weights before and after the removal of the template, and converting the content weight into a molar ratio.

For example, in a manner described below, it can be determined whether or not a zeolite is the zeolite of the present embodiment.

First, XRD measurement of a sample is carried out.

The result thereof is confirmed to have any of the lattice spacings in the above <Table 1> defined in the present embodiment, i.e., to show an RHO-type zeolite.

Then, the kinds and amounts of anion elements are determined by performing ICP analysis. Elements in which the peaks of the metal elements or compounds of the metal elements are detected by XRD measurement are excluded from the measured trivalent elements and tetravalent elements. In the case of a trivalent element, the trivalent element is regarded as $Y_2O_3$. In the case of a tetravalent element, the tetravalent element is regarded as $XO_2$. The molar ratio n=$YO_2/X_2O_3$ of the trivalent element and the tetravalent element is confirmed to be 9.5 or more.

It can be determined that the zeolite is the zeolite of the present embodiment if the result of the XRD measurement and the result of the ICP analysis satisfy the definitions of the present embodiment.

In the zeolite of the present embodiment, the total molar number of Al and Si is preferably 50 mol % or more, more preferably 80 mol % or more, with respect to the molar number of all the cations obtained by the ICP analysis.

In the case of determining a molar ratio n in terms of oxide, mol % of the total amount of Al and Si in cations is 50% or more and more preferably 80 mol % or more; when a metal or the like is supported for use in a catalyst or the like, it can be determined that the metal is not used in the framework, it can be considered that almost all cations used in the framework are Al and Si, and therefore, the calculation may be carried out in consideration of only Al and Si.

[Method for Producing Zeolite of the Present Invention]

Patent Document 2 and Non Patent Documents 2 to 8 describe a method comprising hydrothermal synthesis of a zeolite from an aqueous gel prepared by mixing a crown ether, an alkali, an aluminum atom material solution, and water, and by then dropwise adding a liquid containing a silicon atom material. The zeolite synthesized by the method has a low SAR of less than 9.

In the present embodiment, first, a crown ether, an alkali, and water are mixed to prepare an aqueous crown ether-alkali solution comprising the mixed solution thereof. Then, the aqueous crown ether-alkali solution is added to an aluminum atom material solution, and the resultant is homogeneously mixed, followed by dropwise adding a liquid containing a silicon atom material to the mixture, to thereby prepare an aqueous gel, which is subjected to hydrothermal synthesis, thereby obtaining a zeolite of the present embodiment having the high molar ratio of a tetravalent element Y to a trivalent element X in terms of oxide and having an RHO-type structure.

Although the detailed reason that the RHO-type zeolite having the high molar ratio of the tetravalent element Y to the trivalent element X in terms of oxide can be produced by changing the procedure of mixing the materials in such a manner is not clear, it is presumed that in such a mixing procedure, the crown ether interacts more strongly with the aluminum atom material and the silicon atom material, and the novel RHO-type zeolite having the high molar ratio of the tetravalent element Y to the trivalent element X in terms of oxide can be produced.

<Zeolite Materials>

Materials used for producing the zeolite of the present embodiment are composed basically of a material containing a tetravalent element Y, a material containing a trivalent element X, an alkali, a crown ether as an organic template, and water. The case of using silicon as a typical tetravalent element Y and aluminum as a typical trivalent element X, i.e., the case of using a silicon atom material as the material containing a tetravalent element Y and an aluminum atom material as the material containing a trivalent element X will be described below as an example. In the present embodiment, a component having a crystallization promotion action, such as a seed crystal, may be added.

As the silicon atom material, one or more of colloidal silica, amorphous silica, sodium silicate, trimethyl ethoxysilane, tetraethyl orthosilicate, aluminosilicate gel, and the like may be used. As the aluminum atom material, one or more of aluminum sulfate, aluminum nitrate, sodium aluminate, aluminum oxide, aluminum hydroxide, boehmite, aluminum chloride, aluminosilicate gel, metallic aluminum, and the like may be used. Of these, materials in forms that can be mixed sufficiently homogeneously with other components are desirable, and materials that are easily dissolved in water are particularly preferable.

As the alkali, one or more of sodium hydroxide, potassium hydroxide, rubidium hydroxide, cesium hydroxide, alkaline components in aluminates of the above-described aluminum atom materials and silicates of the silicon atom materials, alkaline components in aluminosilicate gel, and the like may be used. For producing the zeolite of the present embodiment, at least one alkali metal ion selected from the group consisting of lithium, sodium, potassium, rubidium, cesium, calcium, magnesium, strontium, and barium is preferably allowed to exist as an alkali metal ion or an alkaline earth metal ion, and be crystallized. Inclusion of such an alkali metal ion allows the crystallization to easily proceed, and precludes generation of a by-product (impurity crystal).

As the crown ether, which is not particularly limited, a macrocyclic compound having a hetero atom such as oxygen, nitrogen, or sulfur as an electron-donating (donor) atom is preferable as described above, and 12-crown-4-ether, 15-crown-5-ether, 18-crown-6-ether, 24-crown-8-ether, dibenzo-18-crown-6-ether, cryptand [2.2], and cryptand [2.2.2] are particularly preferable in view of ease of generation of zeolite crystals, and the like.

In the case of producing a zeolite comprising another metal element such as iron or copper, inorganic acid salts such as sulfates, nitrates, phosphates, chlorides, and bromides, and organic acid salts such as acetates, oxalates, and citrates of transition metals, organometallic compounds such as pentacarbonyl and ferrocene, and the like are ordinarily used as materials for such other metal elements, without particular limitation. Of these, the inorganic acid salts and the organic acid salts are preferred from the viewpoint of solubility in water. In some cases, a colloidal oxide or a fine powdery oxide may be used. When such another metal element is copper, the material is preferably copper(II)

nitrate or copper(II) acetate, more preferably copper(II) acetate. When the metal element is iron, the material is preferably iron(II) nitrate or iron(II) acetate, like copper.

As such another metal material, two or more different kinds of metals or compounds may be used in combination.

<Preparation of Aqueous Crown Ether-Alkali Solution>

In the present embodiment, when an aqueous crown ether-alkali solution is prepared, the order of mixing each material is not limited but may be selected as appropriate depending on conditions used; ordinarily, first, a crown ether is dissolved in water, followed by adding an alkali source and mixing the resultant. In this case, the mixture may be performed at room temperature; however, for sufficiently dissolving the materials, mixing temperature is ordinary 50° C. or more and preferably 60° C. or more, and the upper limit thereof, which is not particularly set, is ordinarily 200° C. or less, preferably 150° C. or less, and particularly preferably 100° C. or less. The room temperature is temperature in a laboratory in a state in which strict thermal management is not performed.

With regard to the concentration of each component in the aqueous crown ether-alkali solution, as for the crown ether, the concentration of the crown ether in the aqueous crown ether-alkali solution is preferably 10% by weight or more, particularly preferably 20% by weight or more, and preferably 80% by weight or less, particularly preferably 70% by weight or less, in view of ease of generation of zeolite crystals, and the alkali is preferably used so that the molar ratio of an alkali metal content in an aqueous gel subjected to hydrothermal synthesis with respect to silicon atoms in the aqueous gel is preferably 0.1 or more, particularly preferably 0.2 or more, and preferably 0.7 or less, particularly preferably 0.6 or less, in view of the ease of the generation of the zeolite crystals.

Thus, when materials comprising alkaline components are used as aluminum atom materials or silicon atom materials, it is preferable to use the materials so that the total including the alkaline components in the materials is the above-described alkali metal content.

The aqueous crown ether-alkali solution does not substantially contain any aluminum atom material or any silicon atom material. In this case, "not substantially contain" refers to a content of 0.1% by weight or less in the aqueous crown ether-alkali solution, and preferably refers to no containing.

<Preparation of Aluminum Atom Material Solution>

The aluminum atom material solution is prepared by dissolving the above-described aluminum atom material in water. The concentration of the aluminum atom material in the aluminum atom material solution is preferably 5 to 50% by weight, particularly preferably 10 to 40% by weight, in view of ease of gel preparation and production efficiency.

The aluminum atom material solution does not substantially contain any crown ether or any silicon atom material. In this case, "not substantially contain" refers to a content of 1% by weight or less in the aluminum atom material solution, and preferably refers to no containing.

<Preparation of Aqueous Gel>

In the case of adding the aqueous crown ether-alkali solution to the aluminum atom material solution, the rate of the addition thereof is not limited but may be selected as appropriate depending on conditions used. Moreover, in the case of dropwise adding the liquid containing a silicon atom material to the mixed liquid of the aluminum atom material solution and the aqueous crown ether-alkali solution, the rate of the addition thereof is not limited but may be selected as appropriate depending on conditions used. For obtaining a more homogeneous aqueous gel, it is preferable to perform conditioning such as increase in stirring rate or slow dropwise addition of a liquid containing a silicon atom material. Temperature in the preparation of the aqueous gel is not particularly limited, but the preparation is ordinarily performed at ordinary temperature (around 0 to 50° C.)

As the liquid containing the silicon atom material, a liquid in which the silicon atom material has been already made into an aqueous dispersion of silica of around 5 to 60% by weight like silica sol can be used as is. In the case of preparation of another liquid containing a silicon atom material, it is preferable to perform the preparation of the liquid as an aqueous solution or an aqueous dispersion in which the concentration of the silicon atom material is around 5% by weight or more, particularly 10% by weight or more, and 60% by weight or less, particularly 50% by weight or less.

Like the aluminum atom material solution, the liquid containing the silicon atom material does not substantially contain any aluminum atom material or any crown ether. In this case, "not substantially contain" refers to a content of 0.1% by weight or less in the liquid containing the silicon atom material, and preferably refers to no containing.

In the present embodiment, the aqueous gel subjected to hydrothermal synthesis is prepared by dropwise adding the liquid containing the silicon atom material to the mixed liquid of the aluminum atom material solution and the aqueous crown ether-alkali solution. The concentration of each material in the aqueous gel is determined as appropriate so that the obtained zeolite satisfies the above-described n- and m-values. A ratio between silicon atoms and aluminum atoms in the aqueous gel, represented by a molar ratio between oxides of the corresponding elements, i.e., a $SiO_2/Al_2O_3$ molar ratio, is ordinarily 5 or more, preferably 9 or more, and more preferably 9.5 or more. Further, the ratio is ordinarily 500 or less, preferably 100 or less, and more preferably 30 or less.

Further, the water content of the aqueous gel subjected to hydrothermal synthesis is preferably 20% by weight or more, particularly preferably 30% by weight or more, and preferably 80% by weight or less, particularly preferably 70% by weight or less, in view of ease of generation of zeolite crystals and a production cost.

The aqueous gel prepared in the above-described manner may be subjected to hydrothermal synthesis just after the preparation; however, for obtaining the zeolite having high crystallinity, it is preferable to allow the aqueous gel to undergo aging under a predetermined temperature condition. Aging temperature is ordinarily 100° C. or less, preferably 80° C. or less, and still more preferably 60° C. or less, and the lower limit thereof, which is not particularly set, is ordinarily 0° C. or more and preferably 10° C. or more. The aging temperature may be constant during the aging, or may be varied step by step or continuously. Aging time, which is not particularly limited, is ordinarily 2 hours or more, preferably 3 hours or more, still more preferably 5 hours or more, and ordinarily 30 days or less, preferably 10 days or less, and still more preferably 4 days or less.

<Hydrothermal Synthesis>

The hydrothermal synthesis is performed by putting, in a pressure-resistant container, the aqueous gel prepared in the above-described manner, and by maintaining predetermined temperature under stirring or while rotating or swinging the container, or in a static, under self-generating pressure or under such gas pressurization that crystallization is not inhibited.

Reaction temperature in the hydrothermal synthesis is ordinarily 90° C. or more, preferably 120° C. or more, still more preferably 150° C. or more, and ordinarily 300° C. or less, preferably 250° C. or less, still more preferably 220° C. or less. Reaction time, which is not particularly limited, is ordinarily 2 hours or more, preferably 3 hours or more, still more preferably 5 hours or more, and ordinarily 30 days or less, preferably 10 days or less, still more preferably 6 days or less. The reaction temperature may be constant during the reaction, or may be varied step by step or continuously. The reaction under the above-described conditions inhibits generation of a type of zeolite different from the zeolite of the present embodiment.

After the above-described hydrothermal synthesis, a zeolite which is a product is separated from a hydrothermal synthesis reaction liquid. The obtained zeolite (hereinafter referred to as "zeolite containing template and the like") contains both or either of a crown ether as a template and an alkali metal in pores. A method for separating the zeolite containing the template and the like from the hydrothermal synthesis reaction liquid is not particularly limited. Ordinarily, examples of the method include a method by filtration, decantation, direct drying, or the like.

The zeolite containing the template and the like separated and collected from the hydrothermal synthesis reaction liquid can be washed with water, dried, and then subjected to calcining or the like as needed in order to remove the crown ether as the template, and the like used in the production. When the zeolite of the present embodiment is used as a use of a catalyst (encompassing a catalyst support), an adsorbent, or the like, it is preferable to use the zeolite after the removal of them.

As treatment for removing the template and/or the alkali metal, liquid phase treatment using an acid solution or a chemical liquid containing a template decomposition component, ion-exchange treatment using resin or the like, or thermal decomposition treatment may be adopted, or these treatments may be used in combination. Ordinarily, a contained organic substance (template and the like) can be removed by a method such as calcining at a temperature of 300° C. to 1000° C. under an inert gas containing air or oxygen, or inert gas atmosphere, or extraction with an organic solvent such as an aqueous ethanol solution. Preferably, the removal of the template and the like by the calcining is preferred in view of productability. In this case, calcining temperature is preferably 400° C. or more, more preferably 450° C. or more, still more preferably 500° C. or more, and preferably 900° C. or less, more preferably 850° C. or less, still more preferably 800° C. or less. As the inert gas, nitrogen or the like can be used.

Furthermore, an alkali metal moiety converted into a H-type or a $NH_4$-type utilizing the ion exchange ability of a zeolite can be used. For the method thereof, a known technology can be adopted. The method can be performed, for example, by, e.g., a method of treatment with an ammonium salt such as $NH_4NO_3$ or $NaNO_3$, or an acid such as hydrochloric acid, ordinarily, at room temperature to 100° C., followed by washing with water.

<Zeolite Containing Other Metal Element>

In the case of producing the above-described zeolite comprising the other metal element, the zeolite may be produced by adding another metal element material (hereinafter referred to as "metal material") to an aqueous gel to be subjected to hydrothermal synthesis, and then performing the hydrothermal synthesis. In this case, when the added other metal element is a trivalent or tetravalent metal element, most thereof is incorporated into a framework structure.

Alternatively, the zeolite comprising the other metal element may be produced by a supporting method in which the zeolite of the present embodiment obtained by hydrothermal synthesis is dispersed in an aqueous metal material solution containing a metal material at a concentration of around 0.5% by weight or more and 80% by weight or less, and is impregnated or subjected to ion exchange.

In this case, there can be adopted a method in which the operation of dispersing the zeolite in the metal material solution, then filtering the zeolite, and washing the filtered zeolite with water is carried out once or repeated a plurality of times as needed, and the resultant is then dried at 60° C. or more and 200° C. or less and calcined at ordinarily 300° C. or more, preferably 400° C. or more, and 1000° C. or less, preferably 900° C. or less, for ordinarily 0.5 hour or more, preferably 1 hour or more, and 24 hours or less, preferably around 12 hours or less.

[Uses of Zeolite of the Present Invention]

Uses of the zeolite of the present embodiment are not particularly limited; however, since the zeolite of the present embodiment has a peculiar crystal structure, the zeolite is preferably used as a catalyst, an adsorbent, a separation material, or the like. Further, the zeolite is particularly preferably used in, e.g., a catalyst for purifying an exhaust as from an automobile or the like because of having high high-temperature water heat endurance.

<Catalyst for Exhaust Gas Treatment>

When the zeolite of the present embodiment is used as a catalyst for exhaust gas treatment, such as a catalyst for purifying automobile exhaust emissions, the zeolite of the present embodiment may be used as is, or the zeolite on which a metal is supported may be used as needed. Furthermore, the zeolite which is mixed with a binder such as silica, alumina, or clay mineral, and is subjected to granulation and formation can also be used. The zeolite which is formed in a predetermined shape using an application method or a formation method can also be used, and the zeolite which is formed in a honeycomb shape can be preferably used.

In the case of obtaining the formed body of the catalyst comprising the zeolite of the present embodiment by the application method, the formed body is ordinarily produced by mixing the zeolite of the present embodiment with an inorganic binder such as silica or alumina to produce slurry, applying the resultant to the surface of a formed body produced with an inorganic material such as cordierite, and calcining the resultant. In this case, a catalyst having a honeycomb shape can be preferably obtained by applying the resultant to a formed body having a honeycomb shape.

In the case of obtaining the formed body of the catalyst comprising the zeolite of the present embodiment by formation, the formed body is ordinarily produced by kneading the zeolite with an inorganic binder such as silica or alumina, or an inorganic fiber such as an alumina fiber or a glass fiber, and subjecting the resultant to formation such as an extrusion method or a compression method, and subsequently to calcining. In this case, a catalyst having a honeycomb shape can be preferably obtained by forming the resultant into a honeycomb shape.

The catalyst comprising the zeolite of the present embodiment is effective as a selective reduction catalyst for NOx, such as a catalyst for purifying automobile exhaust emissions with which an exhaust gas containing a nitrogen oxide is brought in contact to purify the nitrogen oxide.

In particular, the zeolite of the present embodiment comprising the above-described other metal element is effective as a catalyst for exhaust gas treatment. The zeolite is particularly effective as a selective reduction catalyst for NOx. In such a catalyst for exhaust gas treatment, X includes at least aluminum, Y includes at least silicon, and the other metal element is preferably a transition metal and especially preferably iron, copper, or a combination of iron and copper. The content of the other metal element is ordinarily 0.1% by weight or more, preferably 0.3% by weight or more, more preferably 0.5% by weight or more, and ordinarily 20% by weight or less, preferably 10% by weight or less, in the total amount of the zeolite comprising the other metal element is included under an anhydrous state.

A catalyst for exhaust gas treatment in which another metal is supported on the zeolite of the present embodiment is also particularly effective as a selective reduction catalyst for NOx. In such a catalyst for exhaust gas treatment, X includes at least aluminum, Y includes at least silicon, and the supported metal element is preferably a transition metal and especially preferably iron, copper, or a combination of iron and copper. The content of the other metal element is 0.1% by weight or more, preferably 0.3% by weight or more, more preferably 0.5% by weight or more, and ordinarily 20% by weight or less, preferably 10% by weight or less, in the total amount of the zeolite on which the other metal element is supported under an anhydrous state.

The exhaust gas may contain components other than nitrogen oxides, and may contain, for example, hydrocarbon, carbon monoxide, carbon dioxide, hydrogen, nitrogen, oxygen, sulfur oxides, and water. A known reducing agent such as a nitrogen-containing compound such as hydrocarbon, ammonia, or urea may also be used. Specifically, nitrogen oxides contained in various exhaust gases exhausted from diesel automobiles, gasoline automobiles, various diesel engines for stationary power generators, ships, agricultural machines, construction machines, two-wheeled vehicles, and aircrafts, boilers, gas turbines, and the like can be purified by the catalyst for exhaust gas treatment of the present embodiment.

In addition to uses of a catalyst for purifying a nitrogen oxide, the present embodiment can be used, for example, for uses of an oxidation catalysts for oxidizing a surplus reducing agent (for example, ammonia) that is not consumed in the purification of a nitrogen oxide in the latter step in which the nitrogen oxide is purified using the catalyst for purifying a nitrogen oxide of the present embodiment. In such a manner, the catalyst comprising the zeolite of the present embodiment as an oxidation catalyst can oxidize a surplus reducing agent to decrease a reducing agent in an exhaust gas. In this case, a catalyst in which a metal such as a platinum metal is supported on a support such as a zeolite for adsorbing a reducing agent can be used as the oxidation catalyst, the zeolite of the present embodiment can be used as the support, and a catalyst, used as a selective reduction catalyst for a nitrogen oxide, in which the metal such as a platinum metal is further supported on the zeolite of the present embodiment on which, for example, iron and/or copper are supported, can be used.

In the case of using the catalyst comprising the zeolite of the present embodiment, the conditions of contact between the catalyst and an exhaust gas are not particularly limited, the space velocity of the exhaust gas is ordinarily 100/h or more, preferably 1000/h or more, and ordinarily 500000/h or less, preferably 100000/h or less, and temperature used is ordinarily 100° C. or more, preferably 150° C. or more, and ordinarily 700° C. or less, preferably 500° C. or less.

EXAMPLES

The present invention will be more specifically described below with reference to Examples. However, the present invention is not limited at all by Examples described below unless deviating from the gist of the present invention.

Analysis and performance evaluation of zeolites obtained in Examples and Comparative Examples described below were carried out by the following method.

[Evaluation of Catalytic Activity]

A prepared zeolite sample was press-formed, then crushed, passed through a sieve, and sized into 0.6 to 1 mm. One milliliter of the sized zeolite sample was filled into an atmospheric pressure fixed-bed flow-type reaction tube. A zeolite layer was heated while circulating a gas having a composition described in <Table 4> below through the zeolite layer at a space velocity of SV=100000/h. When an outlet NO concentration was constant at each temperature of 175° C., 200° C., 300° C., 400° C., or 500° C., the nitrogen oxide removal activity (catalytic activity before hydrothermal endurance test) of the zeolite sample was evaluated based on the value of:

NO purification rate (%)={(inlet NO concentration)−(outlet NO concentration)}/(inlet NO concentration)×100.

Further, a hydrothermal endurance test in which the zeolite sample was exposed for 5 hours to the atmosphere of air stream (space velocity SV=3000/h) at 800° C. containing 10% by volume of water vapor was conducted, followed by evaluating the nitrogen oxide removal activity (catalytic activity after hydrothermal endurance test) of the zeolite sample in the same manner as described above.

TABLE 4

| Gas component | Concentration |
|---|---|
| NO | 350 ppm |
| NH$_3$ | 385 ppm |
| O$_2$ | 15% by volume |
| H$_2$O | 5% by volume |
| N$_2$ | The balance other than the above components |

[Measurement of Powder XRD]
<Preparation of Sample>

About 100 mg of zeolite sample ground with human power using an agate mortar was allowed to have a constant sample amount using a sample holder having the same shape.

Powder XRD measurement apparatus specifications and measurement conditions were as follows.

TABLE 5

| <a: Powder XRD Measurement Apparatus Specifications> | | |
|---|---|---|
| Apparatus name | | X'Pert Pro MPD manufactured by PANalytical in Netherlands |
| Optical system | | Focusing optical system |
| Optical system specifications | Incident side | Sealed X-ray tube (CuKα) Soller Slit (0.04 rad) Divergence Slit (Variable Slit) Knife edge |
| | Sample table | Rotational sample table (Spinner) |
| | Light receiving side | Semiconductor array detector (X'Celerator) Ni-filter Soller Slit (0.04 rad) |
| | Goniometer radius | 243 mm |

TABLE 5-continued

<b: Measurement Conditions>

| | |
|---|---|
| X-ray power (CuKα) | 40 kV |
| | 30 mA |
| Scanning axis | θ/2θ |
| Scanning zone (2θ) | 3.0 to 50.0° |
| Measurement mode | Continuous |
| Reading width | 0.016° |
| Counting time | 29.8 sec |
| Automatic variable slit (Automatic-DS) | 10 mm (irradiation width) |
| Horizontal divergence mask | 10 mm (irradiation width) |

[Measurement of BET Specific Surface Area]

Measurement was carried out by a circulation-type one-point method using a fully automatic powder specific surface area measurement apparatus (AMS1000) manufactured by Ohkura Riken In.

[Cu Content and Analysis of Zeolite Composition]

The content of silicon and aluminum in the zeolite which is a standard sample, and the elemental analysis of supported copper atoms were as follows.

The zeolite sample was dissolved in an aqueous hydrochloric acid solution by heating, followed by determining the contents $W_1$ (% by weight) of silicon atoms, aluminum atoms, and Cu atoms by ICP analysis. In addition, the calibration curves of the fluorescent X-ray intensities of the analytical elements in the standard sample and the atomic concentrations of the analytical elements were created. Based on the calibration curves, the contents $W_1$ (% by weight) of the silicon atoms, the aluminum atoms, and the copper atoms in the zeolite sample were determined by X-ray fluorescence analysis (XRF). The ICP analysis was carried out using ULTIMA 2C manufactured by HORIBA, Ltd. XRF was carried out using EDX-700 manufactured by SHIMADZU CORPORATION.

Meanwhile, a moisture content $W_{H2O}$ (% by weight) in the sample was determined by thermogravimetric analysis (TG), and the content W (% by weight) of each atom or Cu in the framework structure in the zeolite containing the transition metals under an anhydrous state was calculated based on the following expression (I). TG was carried out using TGA-50 manufactured by SHIMADZU CORPORATION.

$$W=W_1/(1-W_{H2O}) \quad (I)$$

Example 1

An aqueous crown ether-alkali solution was obtained by dissolving 5.2 g of 18-crown-6-ether (manufactured by Tokyo Chemical Industry Co., Ltd.) in 8 g of water, adding 1.3 g of NaOH (manufactured by Wako Pure Chemical Industries, Ltd.) and 2.0 g of CsOH.H$_2$O (manufactured by Mitsuwa Chemicals Co., Ltd.) to the resulting solution, and stirring the resultant at 80° C. for three hours.

An aqueous gel was obtained by dissolving 1.5 g of NaAlO$_2$ (purity: 70% by weight or more, manufactured by KISHIDA CHEMICAL Co., Ltd.) in 5 g of water, then adding 12.7 g of the above-described aqueous crown ether-alkali solution to this solution, and dropwise adding 15 g of silica sol (silica concentration: 40% by weight, LUDOX (registered trademark) HS-40, manufactured by Aldrich) to the resulting mixed solution under stirring.

The aqueous gel was allowed to undergo aging at room temperature for 24 hours, was then put in a pressure-resistant container, and was subjected to hydrothermal synthesis for 72 hours while rotating the pressure-resistant container in an oven at 125° C. (15 rpm). After this hydrothermal synthesis reaction, a reaction liquid was cooled, and generated crystals were collected by filtration. The collected crystals were dried at 100° C. for 12 hours, the XRD of the resulting zeolite powder was then measured, and a zeolite 1 exhibiting an XRD pattern having peaks and relative intensities at positions as shown in <Table 6> in lattice spacing display was able to be synthesized. The XRD pattern of the zeolite 1 is illustrated in FIG. 1. The SAR of the zeolite 1 in the XRF analysis was 9.9.

Figure 2:
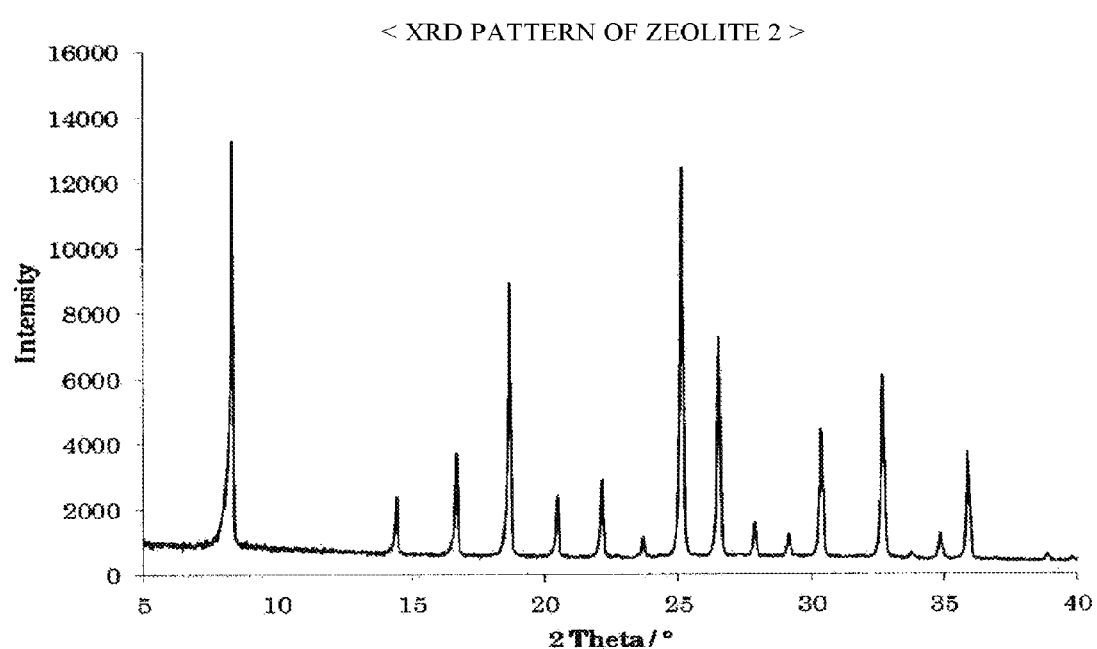
FIG. 2 is a chart illustrating the XRD pattern of a zeolite 2.

Furthermore, the zeolite 1 was calcined for six hours under an air stream at 550° C., to remove organic substances and to obtain a zeolite 2. The XRD of the zeolite 2 obtained in this way was measured to exhibit an XRD pattern having peaks and relative intensities at positions as shown in <Table 7> in lattice spacing display. The XRD pattern of the zeolite 2 is illustrated in FIG. 2. The SAR of the zeolite 2 in the XRF analysis was 9.9. Further, m calculated from the difference between the weights of the zeolite 1 and the zeolite 2 was 0.30.

TABLE 6

<Zeolite 1 (before calcining)>

| 2 Theta/° | d-spacing (Å) | Relative Intensity [100 × I/I (0)] |
|---|---|---|
| 8.317 | 10.623 | 55 |
| 14.438 | 6.13 | 20 |
| 16.683 | 5.31 | 13 |
| 18.665 | 4.752 | 49 |
| 20.464 | 4.337 | 10 |
| 22.116 | 4.016 | 15 |
| 25.134 | 3.517 | 100 |
| 26.507 | 3.338 | 40 |

TABLE 7

<Zeolite 2 (after calcining)>

| 2 Theta/° | d-spacing (Å) | Relative Intensity [100 × I/I (0)] |
|---|---|---|
| 8.317 | 10.623 | 100 |
| 14.441 | 6.129 | 12 |
| 16.687 | 5.309 | 25 |
| 18.682 | 4.746 | 62 |
| 20.482 | 4.333 | 15 |
| 22.148 | 4.010 | 18 |
| 25.153 | 3.538 | 95 |
| 26.540 | 3.356 | 53 |

Example 2

An aqueous crown ether-alkali solution was obtained by dissolving 9.4 g of 18-crown-6-ether (manufactured by Tokyo Chemical Industry Co., Ltd.) in 8.2 g of water, adding 1.3 g of NaOH (manufactured by Wako Pure Chemical Industries, Ltd.) and 2.0 g of CsOH.H$_2$O (manufactured by Mitsuwa Chemicals Co., Ltd.) to the resulting solution, and stirring the resultant at 80° C. for three hours.

An aqueous gel was obtained by dissolving 1.1 g of NaAlO$_2$ (purity: 70% by weight or more, manufactured by KISHIDA CHEMICAL Co., Ltd.) in 5 g of water, then adding 17.7 g of the above-described aqueous crown ether-alkali solution, and dropwise adding 15 g of silica sol (silica concentration: 40% by weight, LUDOX (registered trademark) HS-40, manufactured by Aldrich) to the resulting mixed solution under stirring.

Figure 3:
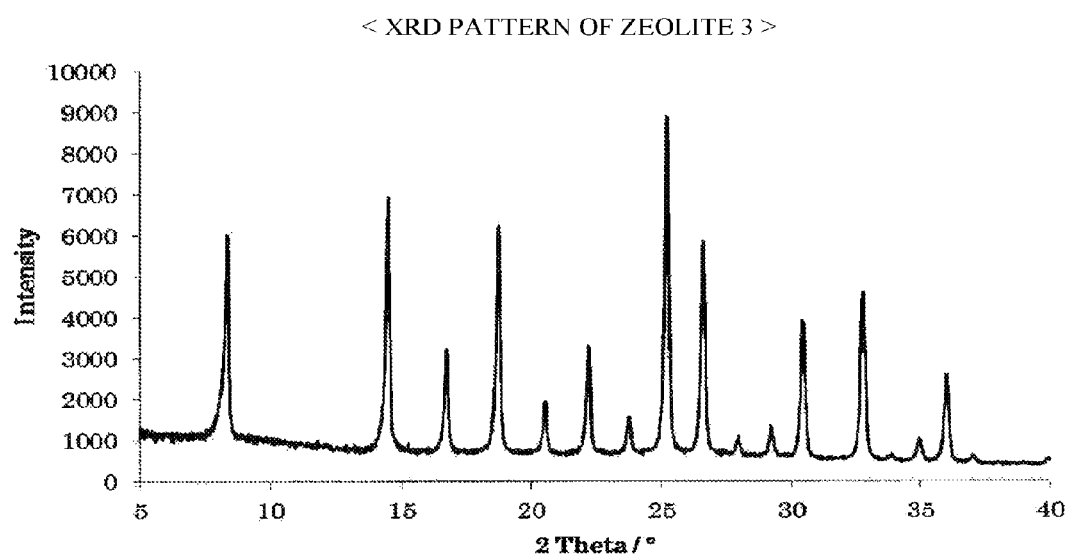
FIG. 3 is a chart illustrating the XRD pattern of a zeolite 3.

The aqueous gel was allowed to undergo aging at room temperature for 24 hours, was then put in a pressure-resistant container, and was subjected to hydrothermal synthesis for 70 hours while rotating the pressure-resistant container in an oven at 155° C. (15 rpm). After this hydrothermal synthesis reaction, a reaction liquid was cooled, and generated crystals were collected by filtration. The collected crystals were dried at 100° C. for 12 hours, the XRD of the resulting zeolite powder was then measured, and a zeolite 3 exhibiting an XRD pattern having peaks and relative intensities at positions as shown in <Table 8> in lattice spacing display was able to be synthesized. The XRD pattern of the zeolite 3 is illustrated in FIG. 3. The SAR of the zeolite 3 in the XRF analysis was 16.6.

Figure 4:
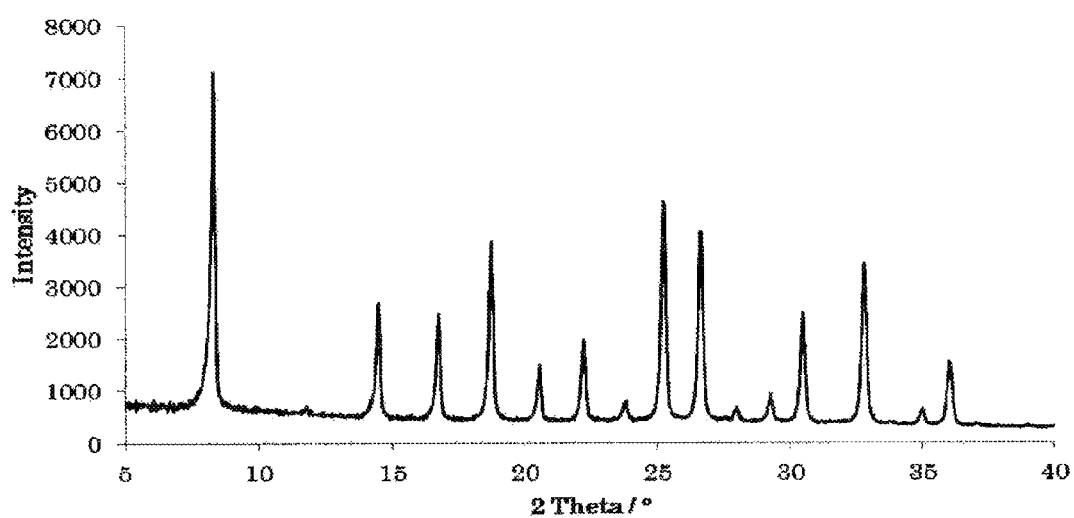
FIG. 4 is a chart illustrating the XRD pattern of a zeolite 4.

Furthermore, the zeolite 3 was calcined for six hours under an air stream at 550° C., to remove organic substances and to obtain a zeolite 4. The XRD of the zeolite 4 obtained in this way was measured to exhibit an XRD pattern having peaks and relative intensities at positions as shown in <Table 9> in lattice spacing display. The XRD pattern of the zeolite 4 is illustrated in FIG. 4. The SAR of the zeolite 4 in the XRF analysis was 15.3. Further, m calculated from the difference between the weights of the zeolite 3 and the zeolite 4 was 0.55.

TABLE 8

<Zeolite 3 (before calcining)>

| 2 Theta/° | d-spacing (Å) | Relative Intensity [100 × I/I (0)] |
|---|---|---|
| 8.334 | 10.610 | 69 |
| 14.489 | 6.109 | 77 |
| 16.736 | 5.293 | 29 |
| 18.746 | 4.730 | 68 |
| 20.546 | 4.319 | 15 |
| 22.214 | 3.999 | 32 |
| 25.234 | 3.526 | 100 |
| 26.622 | 3.346 | 61 |

TABLE 9

<Zeolite 4 (after calcining)>

| 2 Theta/° | d-spacing (Å) | Relative Intensity [100 × I/I (0)] |
|---|---|---|
| 8.350 | 10.580 | 100 |
| 14.520 | 6.095 | 31 |
| 16.752 | 5.288 | 28 |
| 18.779 | 4.722 | 52 |
| 20.579 | 4.312 | 15 |
| 22.247 | 3.993 | 22 |
| 25.268 | 3.522 | 65 |
| 26.655 | 3.342 | 55 |

Example 3

An aqueous crown ether-alkali solution was obtained by dissolving 7.8 g of 18-crown-6-ether (manufactured by Tokyo Chemical Industry Co., Ltd.) in 8 g of water, adding 1.1 g of NaOH (manufactured by Wako Pure Chemical Industries, Ltd.) and 1.66 g of CsOH.H$_2$O (manufactured by Mitsuwa Chemicals Co., Ltd.) to the resulting solution, and stirring the resultant at 80° C. for three hours.

An aqueous gel was obtained by dissolving 0.44 g of NaAlO$_2$ (purity: 70% by weight or more, manufactured by KISHIDA CHEMICAL Co., Ltd.) in 2.5 g of water, then adding 7.4 g of the above-described aqueous crown ether-alkali solution to this solution, and dropwise adding 7.5 g of silica sol (silica concentration: 40% by weight, LUDOX (registered trademark) HS-40, manufactured by Aldrich) to the resulting mixed solution under stirring.

Figure 5:
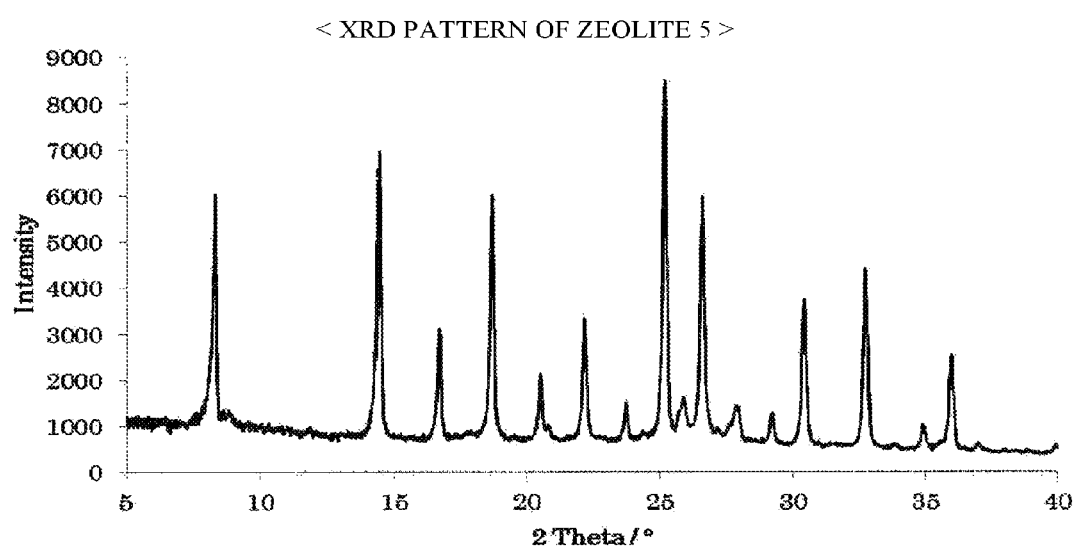
FIG. 5 is a chart illustrating the XRD pattern of a zeolite 5.

The aqueous gel was allowed to undergo aging at room temperature for 24 hours, was then put in a pressure-resistant container, and was subjected to hydrothermal synthesis for 72 hours while rotating the pressure-resistant container in an oven at 170° C. (15 rpm). After this hydrothermal synthesis reaction, a reaction liquid was cooled, and generated crystals were collected by filtration. The collected crystals were dried at 100° C. for 12 hours, the XRD of the resulting zeolite powder was then measured, and a zeolite 5 exhibiting an XRD pattern having peaks and relative intensities at positions as shown in <Table 10> in lattice spacing display was able to be synthesized. The XRD pattern of the zeolite 5 is illustrated in FIG. 5. The SAR of the zeolite 5 in the XRF analysis was 20.6.

Figure 6:
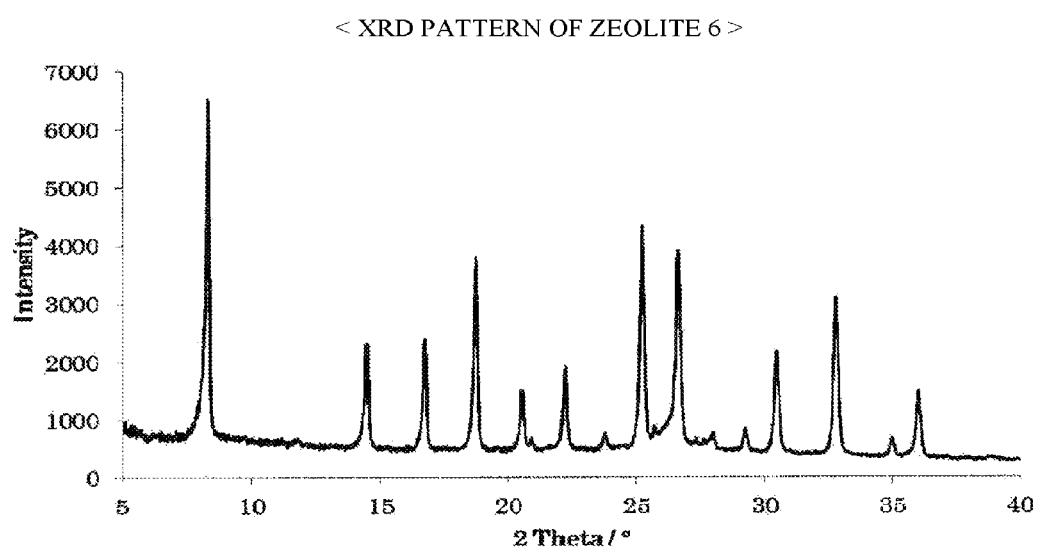
FIG. 6 is a chart illustrating the XRD pattern of a zeolite 6.

Furthermore, the zeolite was calcined for six hours under an air stream at 550° C., to remove organic substances and to obtain a zeolite 6. The XRD of the zeolite 6 obtained in this way was measured to exhibit an XRD pattern having peaks and relative intensities at positions as shown in <Table 11> in lattice spacing display. The XRD pattern of the zeolite 6 is illustrated in FIG. 6. The SAR of the zeolite 6 in the XRF analysis was 18.8. Further, m calculated from the difference between the weights of the zeolite 5 and the zeolite 6 was 0.58.

TABLE 10

<Zeolite 5 (before calcining)>

| 2 Theta/° | d-spacing (Å) | Relative Intensity [100 × I/I (0)] |
|---|---|---|
| 8.346 | 10.585 | 77 |
| 14.475 | 6.114 | 75 |
| 16.72 | 5.298 | 29 |
| 18.731 | 4.733 | 68 |
| 20.532 | 4.322 | 22 |
| 22.199 | 4.001 | 40 |
| 25.219 | 3.529 | 100 |
| 26.621 | 3.346 | 75 |

TABLE 11

<Zeolite 6 (after calcining)>

| 2 Theta/° | d-spacing (Å) | Relative Intensity [100 × I/I (0)] |
|---|---|---|
| 8.351 | 10.579 | 100 |
| 14.506 | 6.101 | 29 |
| 16.768 | 5.283 | 28 |
| 18.764 | 4.725 | 55 |
| 20.565 | 4.315 | 18 |
| 22.247 | 3.993 | 27 |
| 25.267 | 3.522 | 61 |
| 26.654 | 3.342 | 70 |

Example 4

The zeolite 2 produced in Example 1 was dispersed in a 6 M aqueous NH$_4$Cl solution and was subjected to ion exchange at 80° C. for one hour in order to remove Cs ions and Na ions in the zeolite. The zeolite was collected by filtration and was washed with ion-exchanged water three times. Then, the ion exchange and washing were repeated three times. The resulting zeolite powder was dried at 100° C. for 12 hours to obtain a NH$_4$-type zeolite 7.

An aqueous copper(II) acetate solution was obtained by dissolving 2 g of Cu(OAc)$_2$.H$_2$O (manufactured by KISHIDA CHEMICAL Co., Ltd.) in 30 g of water. The zeolite 7 was calcined at 500° C. for two hours, then dispersed in the aqueous copper(II) acetate solution, and subjected to ion exchange at 80° C. for one hour. The zeolite was collected by filtration, and was washed with ion-exchanged water three times. Then, the ion exchange and washing were repeated once. Furthermore, the zeolite was dispersed in an aqueous copper(II) nitrate solution comprising 10 g of Cu(NO$_3$)$_2$.3H$_2$O and 10 g of water, and was subjected to ion exchange at 80° C. for one hour. The zeolite was collected by filtration, and was washed with ion-exchanged water three times, to obtain a zeolite powder, which was dried at 100° C. for 12 hours and then calcined in air at 500° C. for one hour, thereby obtaining a catalyst 1 comprising the Cu-containing zeolite. The Cu content of the catalyst 1 in XRF analysis was 2.5% by weight.

The catalytic activity of the catalyst 1 before and after a hydrothermal endurance test was investigated, and the results are listed in <Table 13>.

Example 5

The zeolite 4 produced in Example 2 was dispersed in a 6 M aqueous NH$_4$Cl solution, was subjected to ion exchange, and was washed, to obtain a NH$_4$-type zeolite 8 in the same manner as in Example 4.

Figure 7:
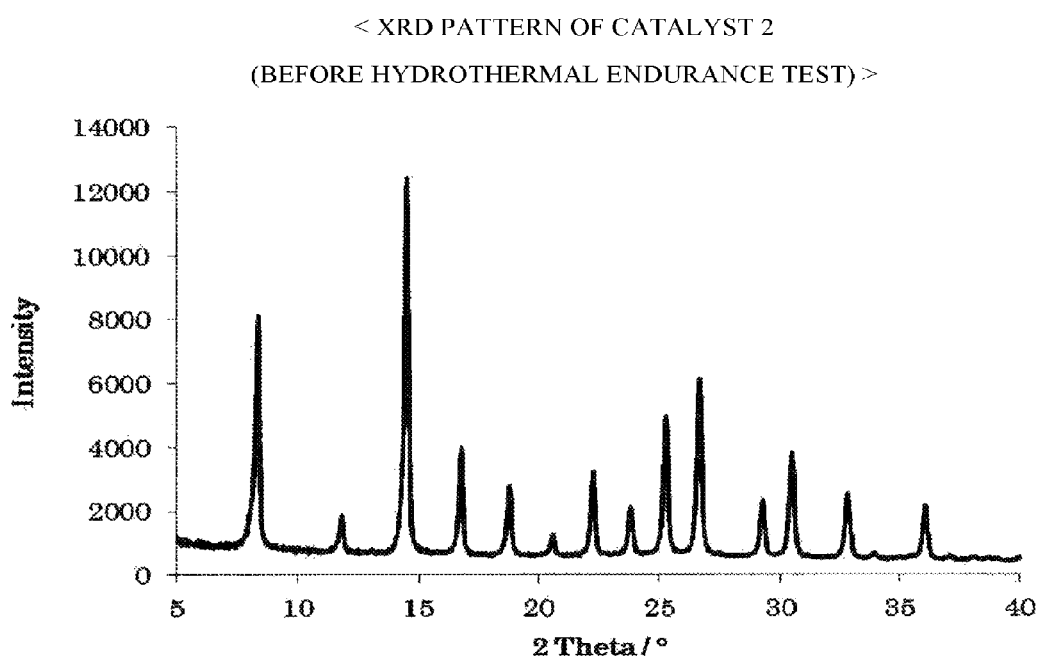
FIG. 7 is a chart illustrating the XRD pattern of a catalyst 2 before a hydrothermal endurance test.

An aqueous copper(II) acetate solution was obtained by dissolving 0.22 g of Cu(OAc)$_2$.H$_2$O (manufactured by KISHIDA CHEMICAL Co., Ltd.) in 3.2 g of water. To the aqueous copper(II) acetate solution, 2.3 g of the zeolite 8 was added, and mixed. Then, the resultant was filtered, dried at 100° C. for ten hours, and calcined in air at 750° C. for two hours, to obtain a catalyst 2. The Cu content of the catalyst 2 in XRF analysis was 3.2% by weight. The XRD measurement results of the catalyst 2 are illustrated in FIG. 7.

Further, the catalytic activity of the catalyst 2 before and after a hydrothermal endurance test was investigated, and the results are listed in <Table 13>.

Figure 8:
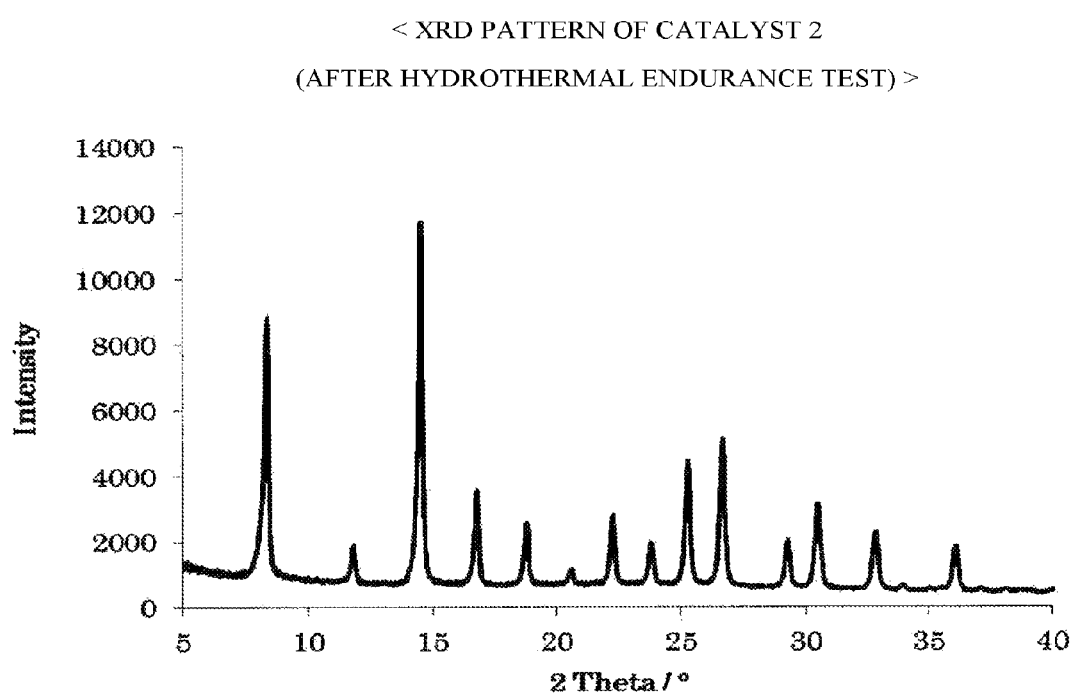
FIG. 8 is a chart illustrating the XRD pattern of the catalyst 2 after the hydrothermal endurance test.

Further, the XRD measurement results of the catalyst 2 after the hydrothermal endurance test are illustrated in FIG. 8.

Comparative Example 1

An RHO-type zeolite was synthesized in the same manner as in Non Patent Document 4. Dissolution of 2.6 g of 18-crown-6-ether (manufactured by Tokyo Chemical Industry Co., Ltd.) in 18 g of water was carried out, 1.3 g of NaOH (manufactured by Wako Pure Chemical Industries, Ltd.), 4.7 g of NaAlO$_2$ (purity: 70% by weight or more, manufactured by KISHIDA CHEMICAL Co., Ltd.), and 2.0 g of CsOH.H$_2$O (manufactured by Mitsuwa Chemicals Co., Ltd.) were added to the resulting solution, and the resultant was stirred at 80° C. for three hours. Then, 30 g of silica sol (silica concentration: 40% by weight, SN-40, manufactured by Nissan Chemical Industries, Ltd.) was dropwise added to the resulting mixed solution under stirring, to obtain an aqueous gel having the following composition:
SiO$_2$:Al$_2$O$_3$:Cs$_2$O:18-crown-6-ether:H$_2$O=10:1:0.3:0.5:100 (molar ratio).

Figure 9:
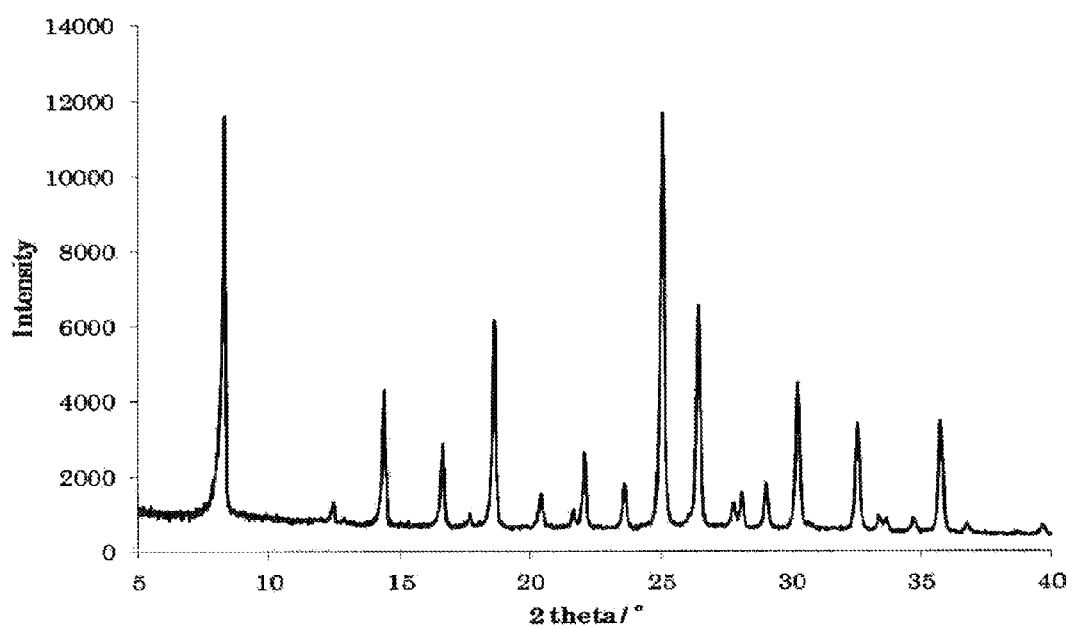
FIG. 9 is a chart illustrating the XRD pattern of a zeolite 9.

The aqueous gel was allowed to undergo aging at room temperature for 24 hours, was then put in a pressure-resistant container, and was subjected to hydrothermal synthesis for 96 hours while rotating the pressure-resistant container in an oven at 110° C. (15 rpm). After this hydrothermal synthesis reaction, a reaction liquid was cooled, and generated crystals were collected by filtration. The collected crystals were dried at 100° C. for 12 hours, to obtain a zeolite 9. The XRD measurement results of the obtained zeolite 9 are illustrated in FIG. 9. The SAR of the zeolite 9 in the XRF analysis was 8.0.

Figure 10:
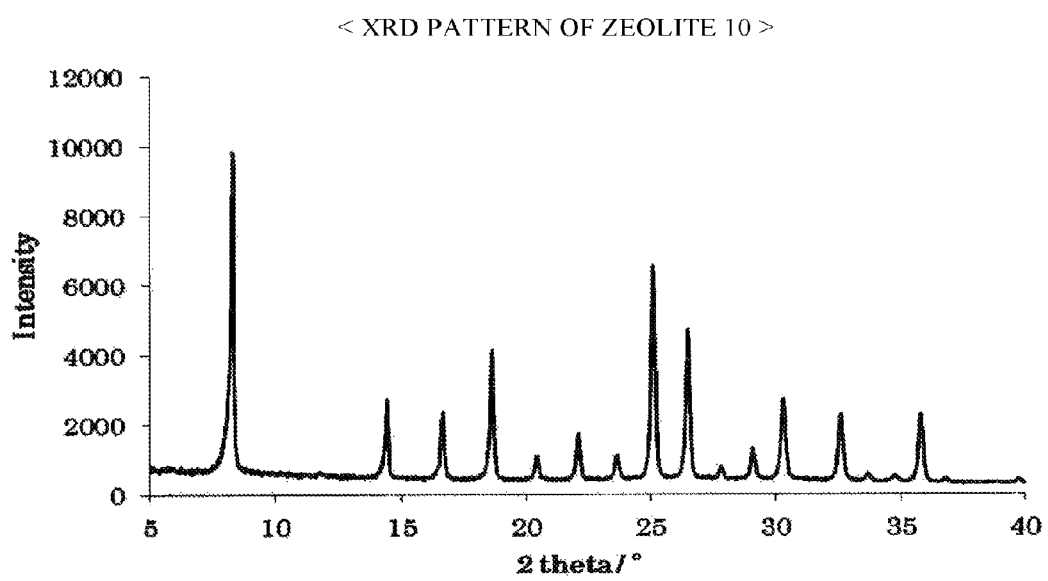
FIG. 10 is a chart illustrating the XRD pattern of a zeolite 10.

Furthermore, the zeolite 9 was calcined for six hours under an air stream at 550° C., to remove organic substances and to obtain a zeolite 10. The XRD of the zeolite 10 obtained in this way was measured to exhibit an XRD pattern having peaks and relative intensities at positions as shown in <Table 12> in lattice spacing display. The XRD pattern of the zeolite 10 is illustrated in FIG. 10. The SAR of the zeolite 10 in the XRF analysis was 8.1.

TABLE 12

<Zeolite 10 (after calcining)>

| 2 Theta/° | d-spacing (Å) | Relative Intensity [100 × I/I (0)] |
|---|---|---|
| 8.316 | 10.624 | 100 |
| 14.423 | 6.136 | 23 |
| 16.668 | 5.314 | 21 |
| 18.649 | 4.754 | 42 |
| 20.462 | 4.337 | 8 |
| 22.099 | 4.019 | 14 |
| 25.103 | 3.545 | 73 |
| 26.489 | 3.362 | 50 |

Comparative Example 2

The zeolite 10 was dispersed in a 3 M aqueous NH$_4$Cl solution and was subjected to ion exchange at 60° C. for five hours. The zeolite was collected by filtration, and was washed with ion-exchanged water three times. Then, the ion exchange and washing were repeated five times. The resulting zeolite powder was dried at 100° C. for 12 hours to obtain a NH$_4$-type zeolite 11. As a result of XRF analysis, 98% of Cs ions were confirmed to be removed.

An aqueous copper(II) acetate solution was obtained by dissolving 1 g of Cu(OAc)$_2$.H$_2$O (manufactured by KISHIDA CHEMICAL Co., Ltd.) in 15 g of water. The zeolite 11 was calcined in air at 500° C. for two hours, then dispersed in the aqueous copper(II) acetate solution, and subjected to ion exchange at 60° C. for two hours. The zeolite was collected by filtration, and was washed with ion-exchanged water three times. Then, the ion exchange and washing were repeated twice. An obtained zeolite powder was dried at 100° C. for 12 hours and then calcined in air at 500° C. for one hour, thereby obtaining a catalyst 3 comprising the Cu-containing zeolite. The Cu content of the catalyst 3 in XRF analysis was 3.4% by weight.

The catalytic activity of the catalyst 3 before and after a hydrothermal endurance test was investigated, and the results are listed in <Table 13>.

Comparative Example 3

The zeolite 11 produced in Comparative Example 2 was calcined in air at 500° C. for two hours, and was then subjected to hydrothermal treatment under atmosphere at a space velocity of SV=3000/h in air containing 10% by volume of water vapor at 600° C. for five hours, thereby performing high-temperature steaming treatment in the same manner as in Non Patent Documents 7 to 9, to obtain a zeolite 12. The result of measuring the BET specific surface area of the zeolite 12 was 854 m²/g. The result demonstrates that the structure of the zeolite was maintained even after the steaming treatment. The SAR of the zeolite 12 in XRF analysis was 8.0.

An aqueous copper(II) acetate solution was obtained by dissolving 1 g of Cu(OAc)$_2$.H$_2$O (manufactured by KISHIDA CHEMICAL Co., Ltd.) in 15 g of water. In the aqueous copper(II) acetate solution, 1.2 g of the zeolite 12 was dispersed and subjected to ion exchange at 60° C. for four hours. The zeolite was collected by filtration, and was washed with ion-exchanged water three times. Then, the ion exchange and washing were repeated twice, to obtain a catalyst 4 comprising the Cu-containing zeolite. The Cu content of the catalyst 4 in XRF analysis was 2.0% by weight. The result of measuring the BET specific surface area of the catalyst 4 was 802 m²/g. The measurement results of the catalytic activity of the catalyst 4 are listed in <Table 13>.

TABLE 13

<Evaluation Results of Catalytic Activity>

| | | | NO purification rate (%) | | | | |
|---|---|---|---|---|---|---|---|
| | | | 175° C. | 200° C. | 300° C. | 400° C. | 500° C. |
| Example 4 | Catalyst 1 | Before hydrothermal endurance test | 20.1 | 22.9 | 53.0 | 98.7 | 92.2 |
| | | After hydrothermal endurance test | 51.3 | 58.8 | 66.4 | 69.9 | 74.9 |
| Example 5 | Catalyst 2 | Before hydrothermal endurance test | 40.8 | 67.8 | 95.2 | 96.3 | 90.0 |
| | | After hydrothermal endurance test | 44.9 | 47.0 | 70.9 | 77.6 | 87.1 |
| Comparative Example 2 | Catalyst 3 | Before hydrothermal endurance test | 5.5 | 8.0 | 84.3 | 99.8 | 99.6 |
| | | After hydrothermal endurance test | 17.9 | 22.6 | 59.3 | 60.9 | 67.8 |
| Comparative Example 3 | Catalyst 4 | Before hydrothermal endurance test | 0.7 | 0.0 | 40.0 | — | — |

Based on the above results, it is found that the zeolite of the present invention has the high molar ratio of an oxide of a tetravalent element Y to an oxide of a trivalent element X, and has high hydrothermal endurance and high catalytic activity.

It will be appreciated that the present invention is not limited to the above embodiments and examples, and various modifications can be made and are also encompassed within the scope of the present invention. The present application is based on a Japanese patent application (Japanese Patent Application No. 2013-162439), filed on Aug. 5, 2013, the contents of which are incorporated herein by reference.

INDUSTRIAL APPLICABILITY

Uses of the zeolite of the present invention are not particularly limited; however, since the zeolite of the present invention has a peculiar crystal structure, the zeolite is preferably used as a catalyst, an adsorbent, a separation material, or the like. Further, the zeolite is particularly preferably used in, e.g., a catalyst for purifying an exhaust gas from an automobile or the like because of having high high-temperature water heat endurance.

The invention claimed is:

1. A zeolite, comprising a trivalent element X and a tetravalent element Y, wherein a molar ratio n=YO$_2$/X$_2$O$_3$ in terms of oxide is 9.5 or more, the zeolite comprises an RHO-type structure, and the zeolite has at least lattice spacings d (Å), detected in a measurement by powder X-ray diffractometry, of: 10.58±0.40, 6.10±0.30, 5.28±0.20, 4.73±0.30, 4.32±0.10, 4.00±0.20, 3.52±0.10, and 3.34±0.10.

2. The zeolite according to claim 1, further comprising a template Q, wherein a molar ratio m=Q/X$_2$O$_3$ is more than 0 and less than 6.

3. The zeolite according to claim 1, wherein X comprises aluminum.

4. The zeolite according to claim 1, wherein Y comprises silicon.

5. The zeolite according to claim 1, further comprising additional metal element other than the trivalent element X or the tetravalent element Y.

6. The zeolite according to claim 5, wherein the additional metal element is iron and/or copper.

7. The zeolite according to claim 5, wherein a content of the additional metal element is 0.5% to 10% by weight in a total amount of the zeolite under an anhydrous state.

8. A catalyst, comprising the zeolite according to claim 1.

9. An exhaust gas treatment catalyst, comprising the zeolite according to claim 1.

10. The exhaust gas treatment catalyst according to claim 9, wherein the exhaust gas treatment catalyst is a selective reduction catalyst suitable for an exhaust gas comprising a nitrogen oxide.

11. A method for producing a zeolite, comprising performing hydrothermal synthesis of a zeolite from an aqueous gel that is prepared by adding a mixed solution comprising a crown ether, an alkali, and water to a solution comprising an aluminum atom material, and by then dropwise adding a liquid comprising a silicon atom material, to obtain a zeolite which comprises Al and Si, wherein a molar ratio $n=SiO_2/Al_2O_3$ in terms of oxide is 9.5 or more, the zeolite comprises an RHO-type structure, and the zeolite has at least lattice spacings d (Å), detected in a measurement by powder X-ray diffractometry, of: 10.58±0.40, 6.10±0.30, 5.28±0.20, 4.73±0.30, 4.32±0.10, 4.00±0.20, 3.52±0.10, and 3.34±0.10.

\* \* \* \* \*